Sept. 9, 1952 W. HELLER 2,610,036
HEATER FOR WORT KETTLES
Filed Feb. 17, 1950
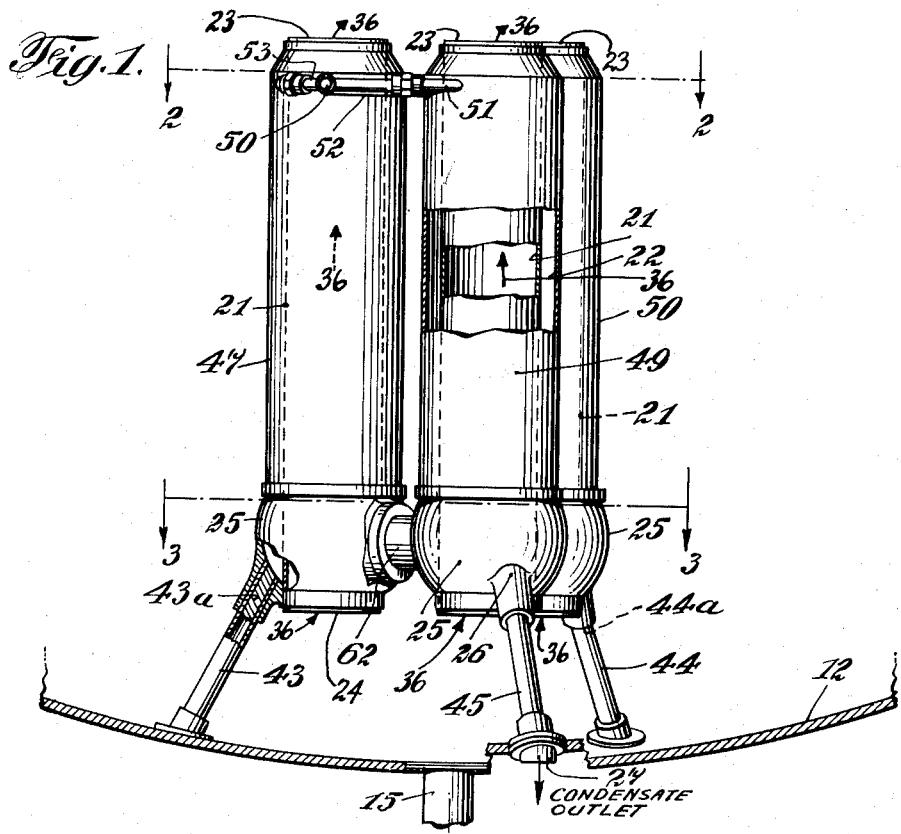
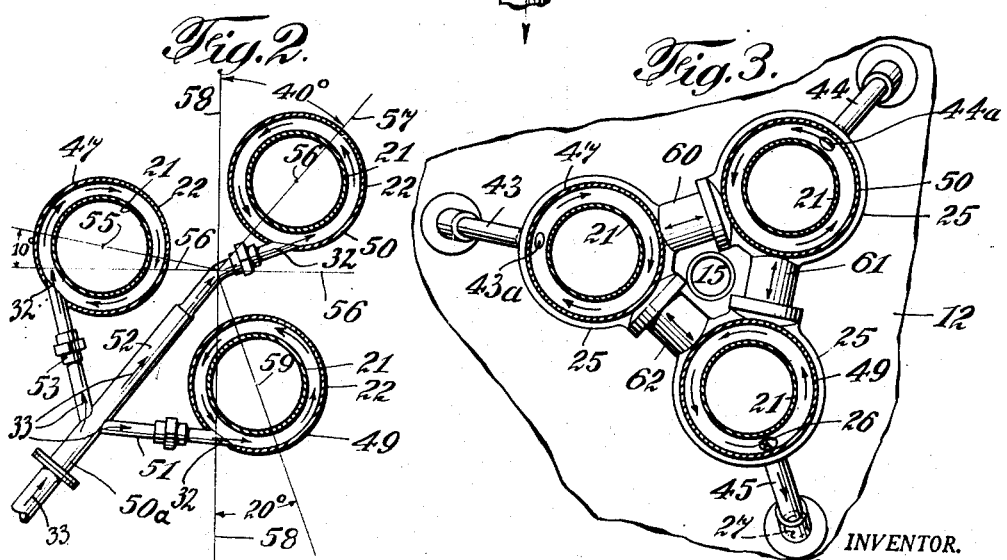
INVENTOR.
William Heller
BY C. P. Goepel
his ATTORNEY Patented Sept. 9, 1952

2,610,036

UNITED STATES PATENT OFFICE 2,610,036

HEATER FOR WORT KETTLES

William Heller, Packanack Lake, N. J., assignor to Schock, Gusmer & Co. Inc., Hoboken, N. J., a corporation of New Jersey Application February 17, 1950, Serial No. 144,638

1 Claim. (Cl. 257—197)

This invention relates to heaters for wort kettles.

The object of the invention is to provide a heater which will quickly transfer its heat to the ambient wort in the kettle, and also prevent any airpocket formation in the heater.

The invention consists in supplying a heater unit formed of a plurality of heaters located wholly beyond the confines of each other, each heater having concentric walls, preferably cylindrical, vertically disposed, forming a hollow bore, with steam entering at its upper end, in a direction tangential to the cylindrical walls to assure a helical flow in the heater from its upper portion to its lower portion, where it leaves the heater with its condensate. The heater has an expanded portion at its lower end to allow for a reasonable expansion of the steam before its discharge.

The invention will be more fully described hereinafter, embodiments thereof shown in the drawings and the invention will be finally pointed out in the claim.

In the accompanying drawings,

Fig. 1 is a vertical view in elevation of an embodiment of the invention, showing three heaters joined together, each provided with a tangentially disposed steam inlet, and with an expanded lower portion;

Fig. 2 is a horizontal section taken on line 2—2 of Fig. 1; and

Fig. 3 is a horizontal section taken on line 3—3 of Fig. 1.

Similar characters of reference indicate corresponding parts throughout the various views.

Centrally disposed within the kettle 12 is a heater. Generally speaking, a heater for a wort kettle is known by U. S. Letters Patent No. 2,468,840 of May 3, 1949, of Robert C. Schock, assignor to the assignee of this application.

The improvement consists in feeding a heater of general cylindrical shape and of concentric walls, with the inlet stream at the upper end of the heater and in a tangential direction, so that the stream moves downwardly in a general spiral direction driving out any air in the heater, and with the steam and/or its condensate discharging at the lower end of the heater.

In Fig. 2, each heater 47, 49 and 50, has concentric walls 21 and 22 closed at their top 23 and at their bottom 24, forming a steam casing. The lower part of the outer wall 22 is expanded radially outwardly having a larger diameter than that of the wall 22 to form the bulging portion 25 for a steam expansion, before its condensate is discharged at 26, and preferably through a pipe 27 which acts as a leg 45 for the heater, in addition to the legs 43 and 44. This pipe 27 extends through the bottom of the tank 12, and the condensate may be carried off in any suitable manner. Preferably, the steam inlet and outlet are at diametrically opposite parts of the heater.

The improvement consists in providing a pipe 51, 52 or 53 for the inlet of the steam and arranging it tangential to the heaters 47, 49 and 50, as shown clearly in Fig. 2. An orifice 32 serves a steam inlet and is shaped generally elliptical, to register with the generally elliptical end of each pipe 51, 52 or 53. The arrows of 33 show the movement of the steam; which in respect to each casing is tangential and then spiral within the same.

A commercial embodiment, of the invention is shown in Figs. 1 to 3, in which three heaters 47, 49, 50 are provided, joined at their lower ends, and supported at their lower ends by supports 43, 44 and 45; the support on leg 45 being hollow and adapted to act as a condensate outlet, in the manner explained in connection with pipe 27. Each heater has an expanded portion 25.

The upper end of the heaters 47, 49, 50 are supplied with steam so that the steam is compelled to flow from the top of the heater to the bottom of the heater downwardly to the bottom, in order to drive all entrained air before it, until it reaches the condensate discharge.

In Fig. 2, a main steam pipe 50a has three branches 51, 52, and 53, each of which is disposed tangentially to its heater, pipe 53 tangential to heater 47; pipe 52 tangential to heater 50, and pipe 51 tangential to heater 49. The axis 55 of heater 47 is on a line 10° from the horizontal line 56 of Fig. 2, the axis 56 of heater 50 is on a line 57, 40° from the vertical 58, and the axis 59 is 20° from the vertical 58. This is the preferred arrangement and is explained to describe the best present form of the embodiment shown.

The lower ends of the heaters 47, 49 and 50, (Fig. 3) are connected with each other at their expanded portions 25, with pipes 60, 61 and 62, so that all of the lower ends form one communicating passage, to provide discharge means into one condensate outlet 27, at the leg 45.

The supports 43 and 44 are plugged as shown by plugs 43a and 44a.

The operation is as follows:

Steam enters through pipe 50a, and is distributed by pipes 53, 52, and 51, which are tangentially disposed to the inner chamber between the walls 21 and 22 of the heaters 47, 49, and 50, respectively. The steam then passes spirally downwardly in each of the heaters, as shown in Fig. 4. Finally, the steam of each heater enters the expanded portion 25 of each heater, and by means of pipes 60, 61 and 62, merges in the outlet of pipe 45, and discharges at condensate outlet 27. The arrows 36 (Fig. 1) show the general movement of the wort upwardly through the open bores of the cylindrical heaters.

This tangential flow of steam not alone prevents any formation of air pockets, but serves to expedite the heating of the heaters, and consequently the ambient contents in the kettle.

I wish it to be understood that I do not desire to be limited to the exact details of construction shown and described, for obvious modifications will occur to a person skilled in the art.

I claim:

In a wort kettle heater unit, the combination of a plurality of heaters independently spaced and located wholly beyond the confines of each other, each heater having concentric vertical cylinder walls forming a steam chamber closed at its top and bottom and forming a single casing, with an upper steam receiving end and a lower steam discharging end, a separate steam supply pipe for the incoming steam to the upper end of each of said casings tangentially to the median of said casing and each having an elliptical orifice registering with an elliptical orifice of the casing for providing a spiral flow in said casing passing downwardly to the lower end of each casing, an expanding bulge portion of larger diameter than the diameter of its casing, at the lower end of each casing to receive the steam spirally descending from said casing, means connecting said bulge portions into one common steam chamber, and a steam discharge means for said common steam chamber, whereby all spirally moving steam flowing in said casings, merge in said connected expanded bulge portions forming said common heat chamber, before being discharged.

WILLIAM HELLER.

REFERENCES CITED

The following references are of record in the file of this patent:

UNITED STATES PATENTS

| Number | Name | Date |
|---|---|---|
| 282,584 | Stephens | Aug. 7, 1883 |
| 516,206 | Kellgren | Mar. 13, 1894 |
| 1,473,422 | Farquhar | Nov. 6, 1923 |
| 2,091,119 | Saint-Jacques | Aug. 24, 1937 |
| 2,262,860 | Roe | Nov. 18, 1941 |
| 2,468,840 | Schock | May 3, 1949 |

FOREIGN PATENTS

| Number | Country | Date |
|---|---|---|
| 4,077 | Sweden | Apr. 14, 1892 |